United States Patent [19]

Hannah et al.

[11] Patent Number: 5,809,337
[45] Date of Patent: Sep. 15, 1998

[54] MASS STORAGE DEVICES UTILIZING HIGH SPEED SERIAL COMMUNICATIONS

[75] Inventors: Eric C. Hannah, Pebble Beach; Jerrold V. Hauck, Fremont, both of Calif.; Richard L. Coulson, Portland, Oreg.

[73] Assignee: Intel Corporation, Santa Clara, Calif.

[21] Appl. No.: 623,759

[22] Filed: Mar. 29, 1996

Related U.S. Application Data

[60] Provisional application No. 60/006,431, Nov. 13, 1995 and provisional application No. 60/011,320 Feb. 8, 1996 and provisional application No. 60/013,302 Mar. 8, 1996.

[51] Int. Cl.⁶ ..................................................... G06F 13/00
[52] U.S. Cl. ........................ 395/853; 395/872; 395/892; 395/878; 395/888; 395/885; 395/250; 395/880; 711/100
[58] Field of Search .................................. 395/250, 892, 395/208, 883–885, 872–879, 880–889; 711/106

[56] References Cited

U.S. PATENT DOCUMENTS

| | | | |
|---|---|---|---|
| 4,124,888 | 11/1978 | Washbura | 395/828 |
| 4,344,132 | 8/1982 | Dixon et al. | 395/250 |
| 5,359,713 | 10/1994 | Moran et al. | 395/872 |
| 5,450,548 | 9/1995 | Matsushima | 395/250 |
| 5,594,743 | 1/1997 | Park | 371/40.1 |
| 5,621,820 | 4/1997 | Rynderman et al. | 382/239 |

OTHER PUBLICATIONS

IEEE Draft Standard for a High Performance Serial Bus, P1394, D8.0v2, Jul. 1995, DS3285. Institute of Electrical and Electronics Engineers, Inc.

*Primary Examiner*—Christopher B. Shin
*Attorney, Agent, or Firm*—Duane, Morris & Heckscher LLP

[57] ABSTRACT

A mass storage device having a storage medium on which digital signals can be stored. The mass storage device is coupleable to a computer through a high-speed serial bus. The high-speed serial bus has a latency and a signal transmission rate sufficient to enable transmission of digital signals between the mass storage device and the computer without interim storage of the digital signals in a buffer inside the mass storage device. The computer has a processor capable of processing the digital signals and the digital signals may be transmitted between the mass storage device and the computer without processing of the digital signals by a processor in the mass storage device.

16 Claims, 2 Drawing Sheets

MASS STORAGE DEVICES UTILIZING HIGH SPEED SERIAL COMMUNICATIONS

CROSS-REFERENCES TO RELATED APPLICATIONS

This non-provisional U.S. national application, filed under 35 U.S.C. §111(a) claims, under 35 U.S.C. §119(e)(1), the benefit of the filing date of provisional U.S. applications Nos. 60/006,431, filed under 35 U.S.C. §111(b) on Nov. 10, 1995; 60/011,320, filed under 35 U.S.C. §111(b) on Feb. 8, 1996; and 60/013,302, filed under 35 U.S.C. §111(b) on Mar. 8, 1996, the teachings of all three being incorporated herein by reference.

BACKGROUND OF THE INVENTION

1. Field of the Invention

This invention relates to the field of mass storage devices for computer systems.

2. Description of the Related Art

Mass storage devices, such as hard disks, CD-ROMs, CD-Rs (Compact Disc-Recordable), tape drives etc. are capable of storing significant amounts of digital signals, e.g., well into the Gigabyte range. A conventional mass storage device, such as mass storage device 10 shown in FIG. 1, typically includes storage medium 11, such as, but not limited to, a magnetic platter or tape for storing digital signals as magnetic fields, or a medium which may be pitted for storing digital signals as a series of pitted and unpitted regions in a flat surface for reading by a laser.

Buffer 12 is provided for temporary, interim storage of digital signals being written to or read from storage medium 11. For example, an application on computer 20, having microprocessor 22 and main memory 24 might invoke transmission of digital signals over bus 15 to mass storage device 10 for storage on storage medium 11. Because bus 15 likely has latency and bandwidth limitations that prevent substantially immediate transmission of all digital signals destined for a particular sector or area on storage medium 11, the digital signals are temporarily stored and reassembled in buffer 12 as they are received by mass storage device 10. After buffer 12 accumulates a complete group of digital signals, they are written to the designated sector or area. Buffer 12 of mass storage device 10 accepts and temporarily holds the signals until all signals to be stored in a particular sector or area have been received by mass storage device 10. Although this method is efficient in that it avoids a need to intermittently write digital signals to a same sector or area as they are intermittently received by mass storage device 10, it requires relatively expensive hardware, such as buffer 12 and processor 13.

Signals delayed by the bandwidth and latency limitations of bus 15 can be written to storage medium 11 as they are received, but this requires many time-wasting revolutions of a disk or platter or positioning of a tape to continuously bring the desired sector or area into a position to be written to as the signals are intermittently received.

An application on computer 20 also might request that signals on storage medium 11 be read and transmitted over bus 15. Instructions typically are provided to mass storage device 10 to acquire digital signals stored on storage medium 11 and to transmit the signals over bus 15 to computer 20. Because of the typically high latency of bus 15, digital signals from storage medium 11 are often read and ready for transmission to computer 20 before bus 15 has been acquired. Therefore the signals are temporarily stored in buffer 12 until bus 15 is acquired. This is inefficient with respect to time and hardware requirements.

Even if bus 15 is timely acquired, bandwidth limitations of bus 15 often prevent real-time transmission of the digital signals to computer 20. In such cases bus 15 becomes a bottleneck at which digital signals back-up. Backed-up signals typically are stored in buffer 12 of mass storage device 10 and transmitted over time as allowed by the bandwidth constraints of bus 15. The continuing growth of the rate at which digital signals can be written to and read from storage media exacerbates the bottlenecking problem associated with conventional bus 15.

Processor 13 controls the interim storage of the digital signals in buffer 12. Processor 13 preferably also can processes digital signals being written to or read from storage medium 11. For example processor 13 can compress signals being written to storage medium 11 and decompress signals being read from storage medium 11. Processor 13 also can perform error correction to correct signals corrupted during transmission between computer 20 and mass storage device 10 and coding correction to ensure that signals being written to storage medium 11 are formatted correctly for compatibility with storage medium 11.

SUMMARY OF THE INVENTION

A mass storage device having a storage medium on which digital signals can be stored. The mass storage device is coupleable to a computer through a high-speed serial bus. The high-speed serial bus has a latency and a signal transmission rate sufficient to enable transmission of digital signals between the mass storage device and the computer without interim storage of the digital signals in a buffer inside the mass storage device.

BRIEF DESCRIPTION OF THE DRAWINGS

The following detailed description will be more fully understood with reference to the accompanying drawings in which.

DETAILED DESCRIPTION OF THE PREFERRED EMBODIMENT

Figure 2:
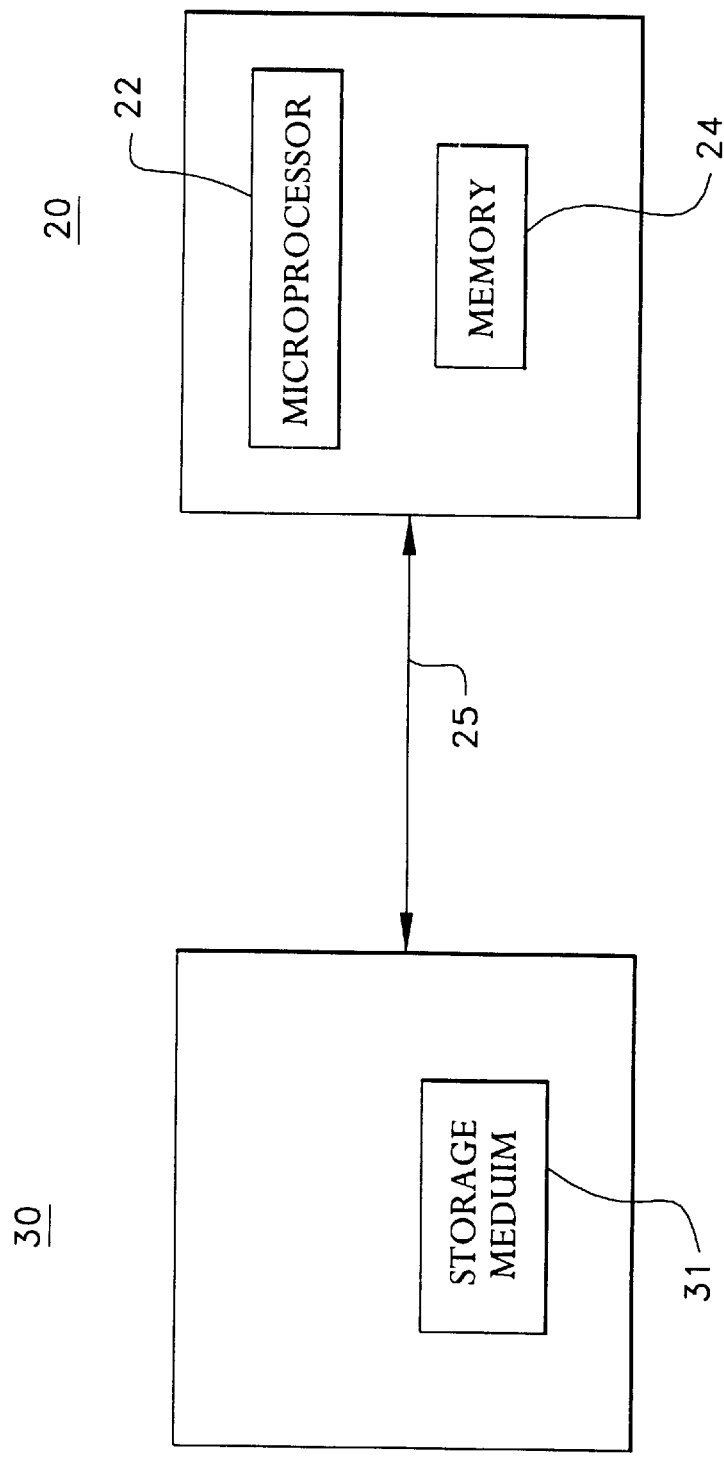
FIG. 2 is a block diagram of the mass storage device of the invention coupled to a computer using a high-speed serial bus.

Referring to FIG. 2, a substantial cost reduction in mass storage devices is possible through the use of a new high-speed serial bus which provides low latency and high bandwidth. A bus of this type is disclosed in U.S. Provisional Applications Nos. 60/006,431, filed on Nov. 10, 1995; 60/011,320, filed on Feb. 8, 1996; and 60/013,302, filed on Mar. 8, 1996, the teachings of all three being incorporated herein by reference.

Figure 1:
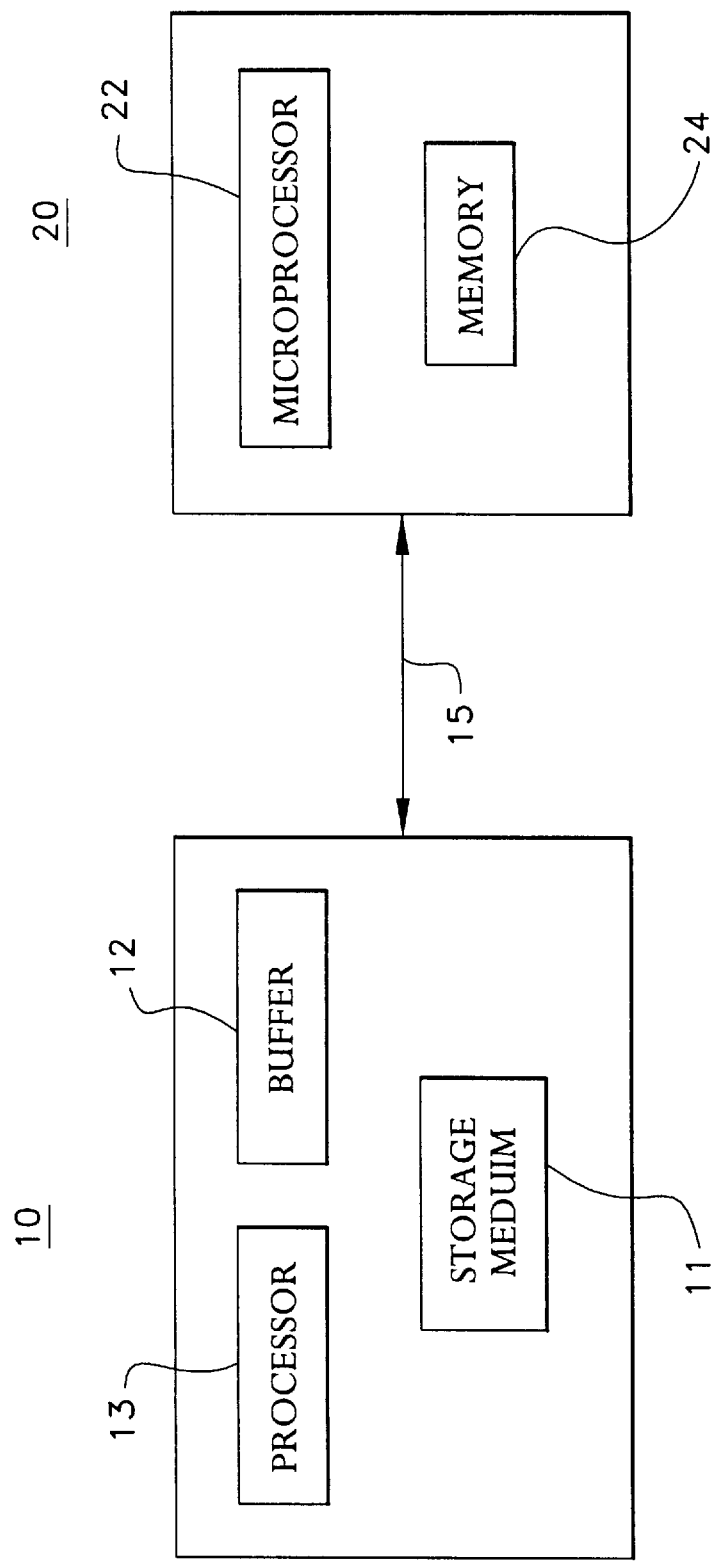
FIG. 1 is a block diagram of a conventional mass storage device coupled to a computer using a conventional bus.

Mass storage device 30 includes storage medium 31, as is known in the art. Storage medium 31, can be, but is not limited to, a magnetic disk, platter or tape for storing digital signals as magnetic fields, or a medium which may be pitted for reading by a laser, such as in the case of CD-ROMs and CD-Rs, as discussed above with reference to storage medium 11 of conventional mass storage device 10 of FIG. 1. However, mass storage device 30 can be constructed without an embedded processor for certain digital signal processing or on-board buffer memory, such as processor 13 and buffer 12, which are part of conventional mass storage device 10 of FIG. 1.

Bus 25 is a high-speed, full duplex, serial bus having very low latency. Bus 25 has a bandwidth (transmission speed) of around 800 Megabits per second "Mbps." This is fast enough to send digital signals between mass storage device 30 and computer 20 at a rate sufficient for high performance input/output (I/O). Bus 25 further has an ability to directly access memory 24 of computer 20 to help ensure substantially immediate access by mass storage device 30 to host memory 24 and digital signals stored on host memory 24.

The high bandwidth, low latency and, in certain instances, the direct memory accessing (DMA) capabilities of bus 25 contribute to substantially real-time transfer of signals from host memory 24 of computer 20 to mass storage device 30. Entire packets of signals which are to be written onto a same sector or area of storage medium 31 can be transmitted together as a unit in real time. A need for buffers is reduced or eliminated in mass storage device 30 for temporary interim storage of digital signals from computer 20, such as to reassemble packets of digital signals destined for storage on a same sector or area of storage medium 31.

The high bandwidth and low latency of bus 25 combine to contribute to real-time transmission of signals which have been read from storage medium 31 of mass storage device 30 to computer 20. This is true even though modern mass storage devices tend to deliver vast amounts of digital signals to a bus in a very short time for transmission to a computer. For example, once the designated sector or area of storage media which is to be read is mechanically located, large amounts of digital signals are read and are ready for transmission. The very low latency of bus 25 allows mass storage device 30 to quickly acquire a signal transmission path for signals to be transmitted to computer 20. The high bandwidth (800 Mbps) allows for a large quantity of digital signals to be sent in a very short time over the bus, thereby reducing the occurrence of signal bottlenecks and back-ups in mass storage device 30. The DMA capabilities reduce delays in storing the signals into memory 24. The high bandwidth and low latency, especially, eliminate a need for an on-board buffer for interim storage of the digital signals, since the digital signals may be sent to computer 20 essentially as they are read from storage medium 31 of mass storage device 30.

The low latency, high bandwidth and DMA capabilities of high-speed serial bus 25 further aid real-time processing by microprocessor 22 of computer 20 of the digital signals being transmitted between mass storage device 30 and computer 20. This feature eliminates a need for an on-board, embedded processor for digital signal processing in mass storage device 30, as was known in conventional mass storage devices, such as processor 13 in mass storage device 10 of FIG. 1. Conventional mass storage devices, such as mass storage device 10 coupled to computer 20 through conventional bus 15, require on-board, closely coupled processor, such as processors 13, to process the digital signals in a timely fashion. Since high-speed bus 25 aids real-time signal transmission between mass storage device 30 and computer 20, digital signals may be processed by microprocessor 22 of computer 20 as if it were a closely-coupled processor on-board mass storage device 30. Therefore, digital signals being written to storage medium 31 can be processed by microprocessor 22 of computer 30 first and transmitted over bus 25 in real-time for storage on storage medium 31. Similarly, digital signals being read from storage medium 31 of mass storage device 30 can be sent in real-time over low latency, high-bandwidth bus 25 for real-time processing by microprocessor 22 of computer 20.

Microprocessor 22 can perform all of the processing chores previously accomplished by an on-board processor, such as processor 13 of conventional mass storage device 10, including digital signal compression and decompression, digital signal transforming, error correction and coding correction. Whereas processor 13 of conventional mass storage device 10 typically is relatively unsophisticated and uses a fixed algorithm to minimize costs, microprocessor 22 can be a modern, fast, relatively sophisticated processor which can execute various, diverse and complex software routines loaded into memory 24 for processing of the digital signals being written to or read from storage medium 31. As microprocessors and digital signal processing routine technology continues to advance, so will the quantity and quality of processing which can be performed on digital signals being transmitted between computer 20 and mass storage device 30.

Mass storage device 30 represents a significant improvement over conventional mass storage technology. Substantial cost savings can be realized by the elimination of on-board hardware, such as control processors and buffers. Furthermore, signal processing improvements no longer require expensive improvements or upgrades of hardware and software in a mass storage device but can be implemented by improvements to, for example, microprocessor 22 in computer 20 and software running on microprocessor 22. Significantly, computer processor technology continues to rapidly advance, and as it does, so will improvements to the quality and flexibility of processing which may be performed on the digital signals being read from or written to storage medium 31 of mass storage device 30.

It should be understood that various changes in the details, materials, and arrangements of the parts which have been described and illustrated in order to explain the nature of this invention may be made by those skilled in the art without departing from the principle and scope of the invention as expressed in the following claims.

What we claim is:

1. A mass storage device, comprising:
   (a) a storage medium on which digital signals can be stored, wherein:
   the mass storage device is coupleable to a computer through a high-speed serial bus, the high-speed serial bus having a latency and a signal transmission rate sufficient to enable transmission of the digital signals between the mass storage device and the computer without interim storage of the digital signals in a buffer inside the mass storage device, wherein the computer has a processor capable of processing the digital signals and the digital signals may be transmitted between the mass storage device and the computer without processing of the digital signals by a processor in the mass storage device, further wherein the high-speed serial bus has a bandwidth high enough and a latency low enough to transmit the digital signals in real time and the processor in the computer can perform at least one of digital signal compression, digital signal decompression, digital signal transforming, error correction and coding correction in real time.

2. The mass storage device of claim 1, wherein the processor in the computer processes the signals in real time.

3. The mass storage device of claim 1, wherein the high-speed serial bus has a bandwidth of at least 750 Megabits per second.

4. The mass storage device of claim 1, wherein the mass storage device is one of a hard disk, CD-ROM, CD-R and tape drive.

5. The mass storage device of claim 1, wherein the high-speed serial bus has direct memory accessing capability.

6. A mass storage device, comprising:

(a) a means for storing digital signals, wherein:

the mass storage device is coupleable to a computer means through a means for high-speed serial digital signal transmission, the means for high-speed serial digital signal transmission having a latency and a signal transmission rate sufficient to enable transmission of the digital signals between the mass storage device and the computer means without interim storage of the digital signals in buffer means inside the mass storage device, wherein the computer means has a means for processing capable of processing the digital signals and the digital signals may be transmitted between the mass storage device and the computer means without processing of the digital signals by processing means in the mass storage device, further wherein the means for high-speed serial signal transmission has a bandwidth high enough and a latency low enough to transmit the digital signals in real time and the means for processing in the computer means can perform at least one of digital signal compression, digital signal decompression, digital signal transforming, error correction and coding correction in real time.

7. The mass storage device of claim 6, wherein the means for processing in the computer means processes the signals in real time.

8. The mass storage device of claim 6, wherein the means for high-speed serial signal transmission has a bandwidth of at least 750 Megabits per second.

9. The mass storage device of claim 6, wherein the mass storage device is one of a hard disk, CD-ROM, CD-R and tape drive.

10. The mass storage device of claim 6, wherein the means for high-speed digital signal transmission has a direct memory accessing capability.

11. A method for transmitting digital signals between a computer and a mass storage device, comprising the steps of:

(a) at least one of reading digital signals from and writing digital signals to a storage medium of the mass storage device; and (b) transmitting the digital signals over a high-speed serial bus between the computer and the mass storage device without prior local interim storage of the digital image signals in a buffer in the mass storage device, wherein the computer has a processor capable of processing the digital signals and step (b) further comprises the step of transmitting the digital signals between the mass storage device and the computer without processing of the digital signals by a processor in the mass storage device, further wherein the high-speed serial bus has a bandwidth high enough and a latency low enough to transmit the digital signals in real time, and step (b) comprises the step of transmitting the digital signals in real time, the method further comprising the step of performing with the processor in the computer at least one of digital signal compression, digital signal decompression, digital signal transforming, error correction and coding correction in real time.

12. The method of claim 11, further comprising the step of processing the signals in real time by the processor in the computer.

13. The method of claim 11, wherein the high-speed serial bus has a bandwidth of at least 750 Megabits per second.

14. The method of claim 11, wherein the mass storage device is one of a hard disk, CD-ROM, CD-R and tape drive.

15. The method of claim 11, wherein the high-speed serial bus has direct memory accessing capability.

16. A system, comprising:

(a) a mass storage device having a storage medium on which digital signals can be stored;

(b) a computer; and (b) a high-speed serial bus coupled between the mass storage device and the computer, the high-speed serial bus having a latency and a signal transmission rate sufficient to enable transmission of the digital signals between the mass storage device and the computer without interim storage of the digital signals in a buffer inside the mass storage device, wherein the computer comprises a processor capable of processing the digital signals and the digital signals may be transmitted between the mass storage device and the computer without processing of the digital signals by a processor in the mass storage device, further wherein the high-speed serial bus has a bandwidth high enough and a latency low enough to transmit the digital signals in real time and the processor in the computer can perform at least one of digital signal compression, digital signal decompression, digital signal transforming, error correction and coding correction in real time.

* * * * *